April 5, 1932.  D. W. HICKEY  1,852,412

PIPE CUTTER

Filed June 18, 1930  2 Sheets-Sheet 1

Inventor
Daniel W. Hickey
By Stryker & Stryker
Attorneys

April 5, 1932. D. W. HICKEY 1,852,412
PIPE CUTTER
Filed June 18, 1930 2 Sheets-Sheet 2
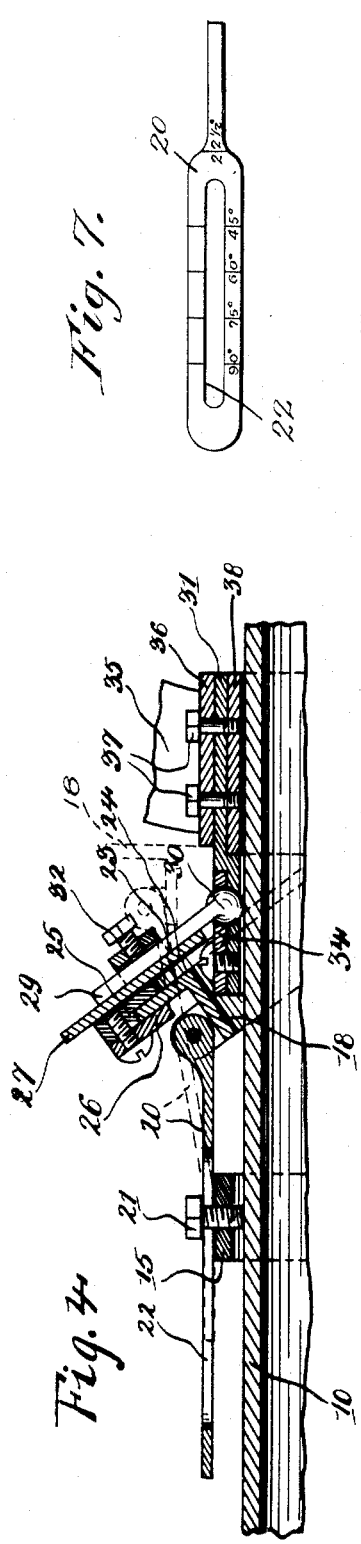
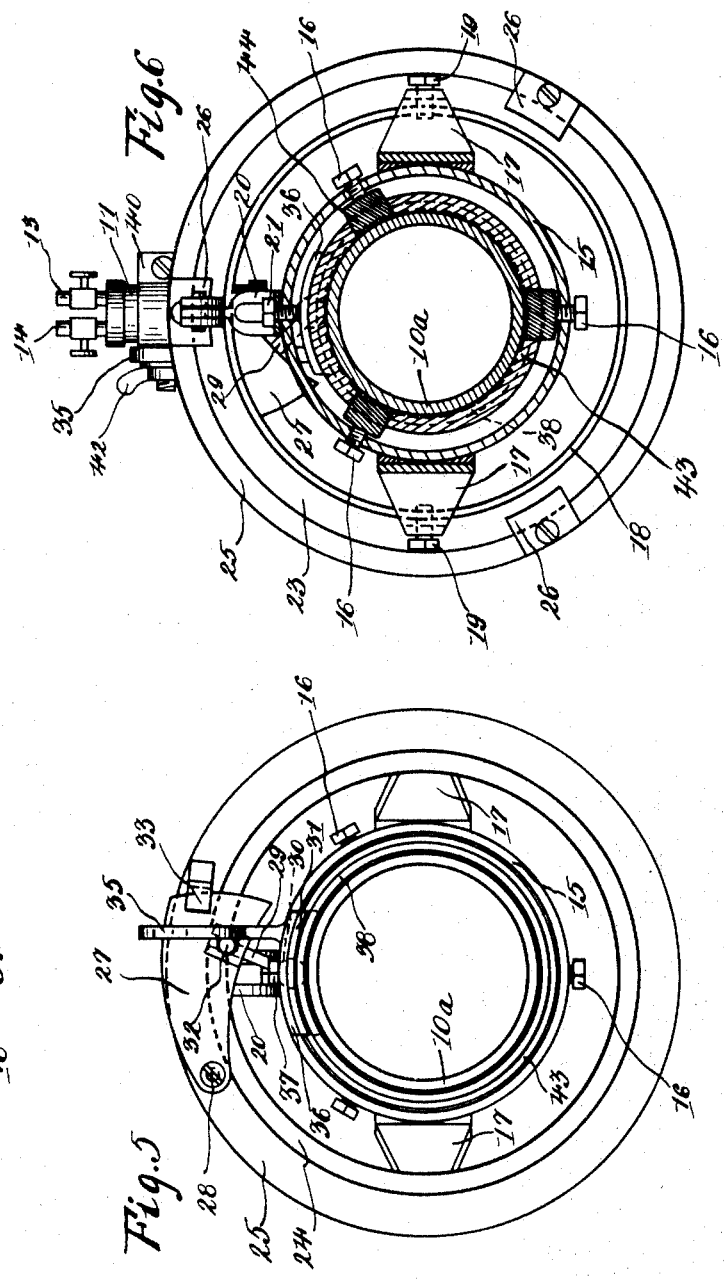
Inventor
Daniel W. Hickey
By Stryker & Stryker
Attorneys Patented Apr. 5, 1932

1,852,412

UNITED STATES PATENT OFFICE

DANIEL W. HICKEY, OF ST. PAUL, MINNESOTA

PIPE CUTTER

Application filed June 18, 1930. Serial No. 461,964.

This invention relates to a pipe cutter employing a torch to cut pipes upon planes at various angles relative to the axis of the pipe, the device being particularly designed for use in cutting pipes of the larger sizes. As is well known, much time and labor is expended with the old forms of hand operated pipe cutters. This is particularly true where the larger sizes of pipes (larger than about two inches in diameter) are to be cut and as far as I am aware no cutter has heretofore been available for rapidly and accurately forming end surfaces on pipes, either beveled or generally in planes extending obliquely relative to the axis of the pipe.

It is my object to provide a novel cutter for rapidly and accurately forming such oblique cuts. Further objects are to provide a cutter designed to form bevels on the pipes simultaneous with the formation of the oblique cuts and to adapt such a cutter for use with pipes of different sizes.

Figure 1:
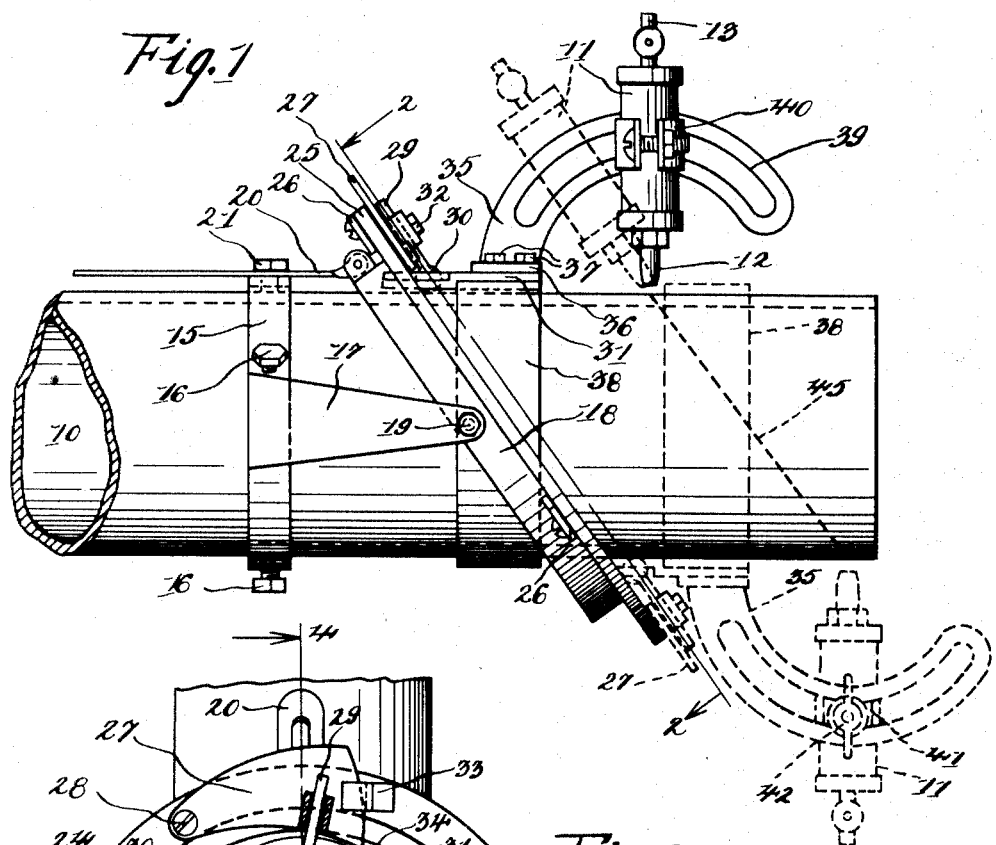
Figure 2:
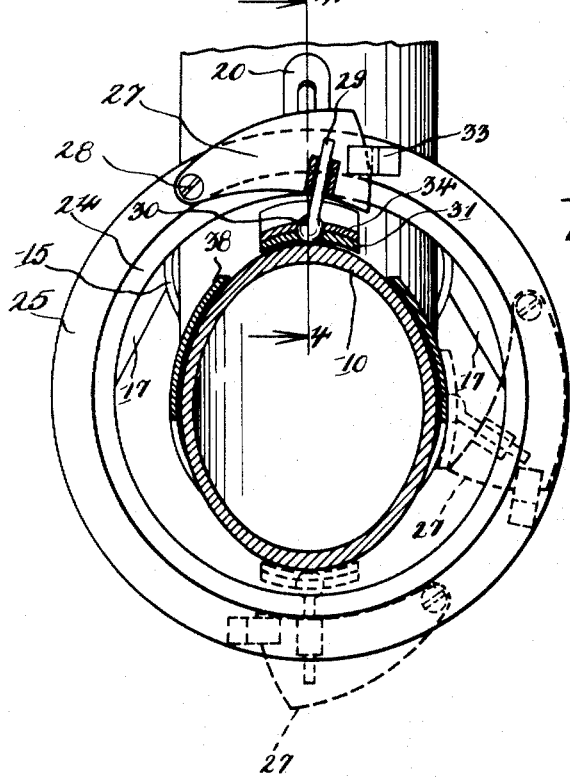
Figure 3:
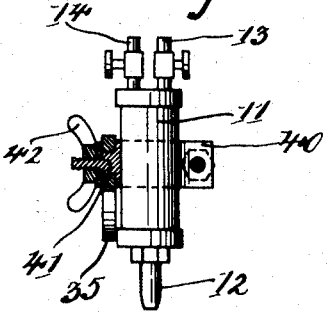

The invention will be best understood by reference to the accompanying drawings in which Figure 1 is a side elevation of my improved cutter mounted on a pipe; Fig. 2 is a transverse section taken on the line 2—2 of Fig. 1; Fig. 3 is a fragmentary section through the clamp and support for the torch showing the torch in place in the clamp; Fig. 4 is a typical, fragmentary, longitudinal section through the pipe, clamp, oblique guide and torch carriage connections; Fig. 5 is an end view of the device as applied to a smaller pipe, with the torch removed and with the large guide ring turned so as to extend in a plane perpendicular to the axis of the pipe; Fig. 6 is a transverse section through the pipe and clamp, with the guide ring in its perpendicular position and showing the device as applied to a small pipe and Fig. 7 is a detail plan view showing the adjustable member for connecting the main guide ring to the clamp.

In the drawings the numeral 10 indicates a large metal pipe which is to be cut by the use of a torch 11 of any suitable or well-known construction. As illustrated, the torch has a tip 12 from which the mixture of oxygen and gas to be burned is delivered and connections 13 and 14 for the oxygen and gas supplies.

A clamp ring 15 fits the outer periphery of the pipe end is secured thereto by a series of screws 16. Arms 17 rigidly connected to the clamp ring 15, project obliquely outward and longitudinally of the pipe 10 to support an annular guide 18. Pivot bolts 19 connect the outer ends of the arms 17 with the guide 18 and the upper periphery of said guide is joined by an adjustable member 20 to the clamp ring 15. As best shown in Fig. 4, a bolt 21 is threaded in the clamp ring 15 and is arranged to engage the member 20 at the sides of a longitudinal slot 22 in said member. This slot permits movement of the guide member 18 and the member 20 relative to the clamp when the angle of the cut is to be adjusted to changes as hereinafter described.

The guide 18 has an outwardly projecting flange 23 and a plane surface 24 on said flange is adapted to determine the angle of the cut. Upon this surface 24 is revolubly mounted a ring 25 having an outer rim portion embracing the outer edge of the flange 23. A series of detents 26 (Fig. 6) engage behind the flange 23 to retain the ring 25 in sliding engagement with the guide 18. Upon the front face of the ring 25, which is parallel to the surface 24, is mounted a link 27 (Fig. 5) having a pivotal connection 28 with said ring and a rod 29, said rod having a spherical head 30 connecting it to a torch carriage 31. The rod 29 slidably fits in a suitable socket provided on the ring 28 and is held in said socket by a set screw 32. To confine the link 27 to movement in a plane parallel to the surface 24, a small clip 33 is rigidly secured to the ring 25 and slidably engages the outer surface of said ring. A suitable cap plate 34 confines the head 30 while permitting pivotal movement thereof in a swivel bearing formed in the carriage 31. A bracket 35 for supporting the torch has a laterally extending flange 36 which is perforated to receive bolts 37 for securing said bracket and the carriage 31 to a second guide 38 having the form of a sleeve slidably and revolubly fitting about the pipe 10.

The bracket 35 projects outward and longitudinally of the pipe and is formed with an arcuate guide groove 39 to permit angular adjustment of the torch 11, as indicated in dotted lines in Fig. 1. The body of the torch 11 is gripped by a clamp 40 having a stud 41, which is substantially rectangular in cross section, projecting in the guide groove 39. As indicated in Figs. 1 and 3, the stud 41 has a threaded extremity adapted to receive a wing nut 42 for securing the torch in selected positions on the bracket 35.

To adapt the device to fit pipes of different sizes, bushings, like that indicated at 43 in Fig. 6, are provided to fit between the inner periphery of the clamp ring 15 and the smaller pipes 10a. The bushing 43 is preferably provided with gripping members 44 adapted to be engaged by the clamp screws 16 to grip the smaller pipe. Guide sleeves 38 of the several diameters of the pipes to be cut are also provided and each of these sleeves has a pair of tapped holes to receive the bolts 37. The torch carriage 31 is merely removed from one guide ring 38 and attached to another of the proper size to fit the particular pipe to be cut when the device is to be used to cut a pipe of a different size.

In Fig. 1 the mechanism is shown as adjusted to cut the pipe 10 upon an oblique plane, indicated by the dotted line 45. The torch may be secured in the full line position shown in Fig. 1 by manipulating the wing nut 42. With the torch in operation the tip 12 directs the flame against the pipe and as the metal is burned the torch is rotated, together with the guide 38 and carriage 31, about the pipe. Simultaneously with this rotating movement, the guide 18 imparts longitudinal movement to the guide 38, torch carriage and torch and the link 27 moves in an arc, about its pivot 28 as a center, to compensate for the varying distance between the guide 18 and the pipe. Thus in passing around the pipe the link 27 assumes the various dotted line positions indicated in Fig. 2, while the tip 12 of the torch is moved in a plane parallel to the surface 24 of the oblique guide. The torch 11 may be moved in its arcuate guide groove 39 to form a bevel at the desired angle. By merely loosening the screw 21 and extending or retracting the link 20, relative to the clamp 15, the guide 18 may be pivoted on the bolts 19 to change the angle of the cut relative to the axis of the pipe. The member 20 is preferably graduated to indicate the angles in degrees and is sufficiently flexible to compensate for the component of movement of the pipe 18 outward from the pipe.

It will now be understood that the guide 18 is not required to be circular in form and it is only necessary to provide a guide surface to determine the angle of the cut. The circular form, however, simplifies the connection between the extensible link 27 and the oblique guide and makes it possible to employ a circular ring, like the revoluble ring 25, to support the link 27. Other forms of movable connection between the extensible link and oblique guide may be provided without departing from the spirit of my invention, and where a circular member 25 for making the connection is not employed the guide 18 may be made of elliptical or other non-circular form. With the larger pipes it is preferable to hold the torch stationary and to rotate the pipe and it is immaterial to the operation of the device whether the pipe or the torch is held stationary. It will thus be understood that in the following claims relative movement is referred to where it is specified that a torch or other members are revoluble about the axis of the pipe.

Having described my invention what I claim as new and desire to protect by Letters Patent is:

1. In a pipe cutter, an annular guide adjustable to determine the angle of the cut relative to the axis of the pipe to be cut, means for securing said guide at predetermined angles relative to the axis of the pipe, a torch carriage revoluble about the axis of the pipe and having a member movably engaging the periphery of the pipe, means providing an extensible and retractile connection between said torch carriage and guide movable in a plane parallel to said guide and means for securing a torch for cutting the pipe on said carriage.

2. In a pipe cutter, an annular guide having a guide surface adjustable to determine the angle of the cut relative to the axis of the pipe to be cut, means for securing said guide at predetermined angles relative to the axis of the pipe, a torch carriage revoluble about the axis of the pipe, a torch secured to said carriage, said torch having a burner tip, means for maintaining said tip in uniform, spaced relation to the outer surface of the pipe and a member so pivotally and slidably secured as to provide an extensible and retractile connection between said torch carriage and guide movable only in a plane parallel to said guide surface.

3. In a pipe cutter, a normally stationary, annular guide adjustable to determine the angle of the cut relative to the axis of the pipe to be cut, means for securing said guide at oblique angles relative to the axis of the pipe, a second guide revoluble about the axis of the pipe, a torch secured to said second guide and having a tip maintained in predetermined, spaced relation to the outer surface of the pipe and an extensible and retractile connection between said stationary and revoluble guides movable in a plane parallel to said stationary guide for advancing said revoluble guide and torch along the pipe simultaneously when the same are rotated.

4. In a pipe cutter, a clamp adapted to be rigidly secured to the pipe to be cut, an annular, normally stationary guide pivotally secured to said clamp, said guide having a guide surface determining the angle of the cut relative to the axis of the pipe to be cut, means for securing said guide in positions oblique to the axis of the pipe, a torch carriage revoluble about the axis of the pipe, an extensible and retractile connection between said carriage and guide and a torch secured to said carriage and having a tip movable in a plane parallel to said guide surface to cut the pipe by burning.

5. In a pipe cutter, a clamp adapted to be rigidly secured to the pipe to be cut, a pair of arms projecting from said clamp at opposite sides of the pipe, an annular guide pivotally secured to said arms, said guide having a guide surface determining the angle of the cut relative to the axis of the pipe to be cut, a ring revolubly fitting the periphery of the pipe, a torch carriage rigidly secured to said ring, means providing a movable connection between said carriage and guide and a torch secured to said carriage and having a tip adapted to direct a flame against the pipe to cut the same by burning.

6. In a pipe cutter, a clamp adapted to be secured to the pipe to be cut, a circular guide pivotally connected to said clamp and of substantially larger diameter than the pipe to be cut, means for securing said guide at predetermined angles relative to the axis of the pipe, said guide having a plane surface determining the angle of the cut, a ring revoluble upon said surface, a second guide revoluble about the axis of the pipe, a torch connected to said second guide and having a tip adapted to be maintained thereby in predetermined, spaced relation to the periphery of the pipe and extensible means connected to said ring and to said second guide and movable in a plane parallel to said guide surface.

7. In a pipe cutter, a clamp adapted to be secured to the pipe to be cut, a circular guide pivotally connected to said arms and of substantially larger diameter than the pipe to be cut, means for securing said guide at predetermined angles relative to the axis of the pipe, said guide having a surface determining the angle of the cut relative to the axis of the pipe, a ring abutting against said surface and revolubly connected to said guide, a second guide revoluble about the axis of the pipe, a torch connected to said second guide and having a tip adapted to be maintained thereby in predetermined spaced relation to the surface of the pipe and an extensible member joining said ring and second guide and movable in a plane parallel to said guide surface, said member having a pivotal connection with said second guide.

8. In a pipe cutter, a clamp adapted to be secured to the pipe to be cut, a pair of arms projecting from said clamp at opposite sides of the pipe, a normally stationary, circular guide pivotally connected to said arms and of substantially larger diameter than the pipe to be cut, means for securing said guide at predetermined angles relative to the axis of the pipe, said guide having a surface determining the angle of the cut, a ring confined against said surface and revolubly connected to said guide, a second guide revoluble about the axis of the pipe, a torch detachably secured to said second guide and having a tip adapted to be maintained thereby in predetermined, spaced relation to the periphery of the pipe and extensible means connected to said ring and second guide and movable in a plane parallel to said guide surface to advance said second guide and torch longitudinally of the pipe simultaneously with rotary movement around the pipe.

9. In a pipe cutter, an annular guide adapted to determine the angle of the cut relative to the axis of the pipe, means for securing said guide in different planes oblique to the axis of the pipe, a torch carriage revoluble about the axis of the pipe and having a member revolubly and slidably engaging the periphery of the pipe, means providing an extensible connection between said torch carriage and guide, a projecting bracket on said carriage, a torch having a tip to be mounted a predetermined distance from the pipe and means for securing said torch to said bracket in position to form a beveled end on the pipe.

10. In a pipe cutter, an annular guide adapted to determine the angle of the cut relative to the axis of the pipe, means for securing said guide in different planes oblique to the axis of the pipe, a torch carriage revoluble about the axis of the pipe and having a member revolubly and slidably engaging the periphery of the pipe, means providing an extensible connection between said torch carriage and guide, a projecting bracket on said carriage having an arcuate guide for a torch, a torch having a tip to be mounted a predetermined distance from the pipe, the center of curvature of said arcuate guide being located substantially on the surface of the pipe to be cut and means for securing said torch on said bracket in various positions on said arcuate guide to form beveled end surfaces on the pipe.

11. In a pipe cutter, an annular guide adapted to determine the angle of the cut relative to the axis of the pipe, means for securing said guide to pipes of different sizes in planes oblique to the axes of the pipes, a torch carriage revoluble about the axis of the pipe, means for removably securing said carriage to members of different thickness revolubly and slidably engaging the periphery of the pipe, means providing an extensible connection between said torch carriage and guide, a torch having a tip to be mounted a predetermined distance from the pipe, means for securing said torch to said carriage and a second guide revolubly and slidably fitting a pipe and secured to said carriage for maintaining said tip a predetermined distance from the pipe during the formation of an oblique cut.

In testimony whereof, I have hereunto signed my name to this specification.

DANIEL W. HICKEY.